US011153906B2

(12) United States Patent
Madhavan et al.

(10) Patent No.: US 11,153,906 B2
(45) Date of Patent: Oct. 19, 2021

(54) ELECTRONIC APPARATUS

(71) Applicant: KABUSHIKI KAISHA TOSHIBA, Tokyo (JP)

(72) Inventors: Narendar Madhavan, Minato Tokyo (JP); Masahiro Sekiya, Inagi Tokyo (JP); Toshihisa Nabetani, Kawasaki Kanagawa (JP); Kensuke Nakanishi, Arakawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 31 days.

(21) Appl. No.: 16/293,083

(22) Filed: Mar. 5, 2019

(65) Prior Publication Data

US 2020/0077441 A1    Mar. 5, 2020

(30) Foreign Application Priority Data

Aug. 30, 2018    (JP) .............................. JP2018-161575

(51) Int. Cl.
*H04W 74/08*    (2009.01)
*H04B 1/38*    (2015.01)
(Continued)

(52) U.S. Cl.
CPC .......... *H04W 74/0816* (2013.01); *H04B 1/38* (2013.01); *H04L 5/0055* (2013.01); *H04L 43/0894* (2013.01)

(58) Field of Classification Search
None
See application file for complete search history.

(56) References Cited

U.S. PATENT DOCUMENTS

2008/0273547 A1\* 11/2008 Phinney ................ H04W 40/16
370/437
2015/0288427 A1    10/2015 Wang et al.
(Continued)

FOREIGN PATENT DOCUMENTS

JP    2008530849 A    8/2008
JP    2009027645 A    2/2009
(Continued)

OTHER PUBLICATIONS

Toshi Hasegawa, "Be Safe with IoT!! ~Risk Management at the Site Changing with ISA100 Wireless~," Dec. 9, 2016, pp. 1-20, https://isa100wci.org/ja-JP/Documents-Japan/2016-Tokuyama/04-ISA100WCI-Tokuyama-web.aspx.
(Continued)

*Primary Examiner* — Shripal K Khajuria
(74) *Attorney, Agent, or Firm* — Holtz, Holtz & Volek PC

(57) ABSTRACT

According to one embodiment, an electronic apparatus includes a receiver and a transmitter. The receiver is configured to receive, from a first wireless apparatus, a first physical frame including a destination address receivable by a second wireless apparatus different from the electronic apparatus. The transmitter is configured to transmit, to the first wireless apparatus, a first response frame including first information regarding the first physical frame, if the first physical frame is successfully received. A transmission period of the first response frame at least partially overlaps with a transmission period of a second response frame including second information regarding the first physical frame received by the second wireless apparatus.

19 Claims, 11 Drawing Sheets

(51) Int. Cl.
*H04L 5/00* (2006.01)
*H04L 12/26* (2006.01)

(56) References Cited

U.S. PATENT DOCUMENTS

| 2016/0021577 A1* | 1/2016 | Du | H04W 28/26 |
| | | | 370/336 |
| 2016/0309514 A1* | 10/2016 | Kwon | H04B 7/0452 |
| 2017/0331587 A1 | 11/2017 | Kim et al. | |

FOREIGN PATENT DOCUMENTS

| JP | 2016501465 A | 1/2016 |
| JP | 2018504015 A | 2/2018 |
| WO | 2006083139 A1 | 8/2006 |

OTHER PUBLICATIONS

Tektronix, "Wi-Fi: Overview of the 802.11 Physical Layer and Transmitter Measurements," 2013, pp. 1-43, http://www.cnrood.com/public/docs/WiFi_Physical_Layer_and_Transm_Meas.pdf.

The Institute of Electrical and Electronics Engineers, Inc., "IEEE Std 802.11TM-2016 (Revision of IEEE Std 802.11-2012)—IEEE Standard for Information technology—Telecommunications and information exchange between systems Local and metropolitan area networks—Specific requirements—Part 11: Wireless LAN Medium Access Control (MAC) and Physical Layer (PHY) Specifications," Dec. 14, 2016, pp. 1-3532.

\* cited by examiner

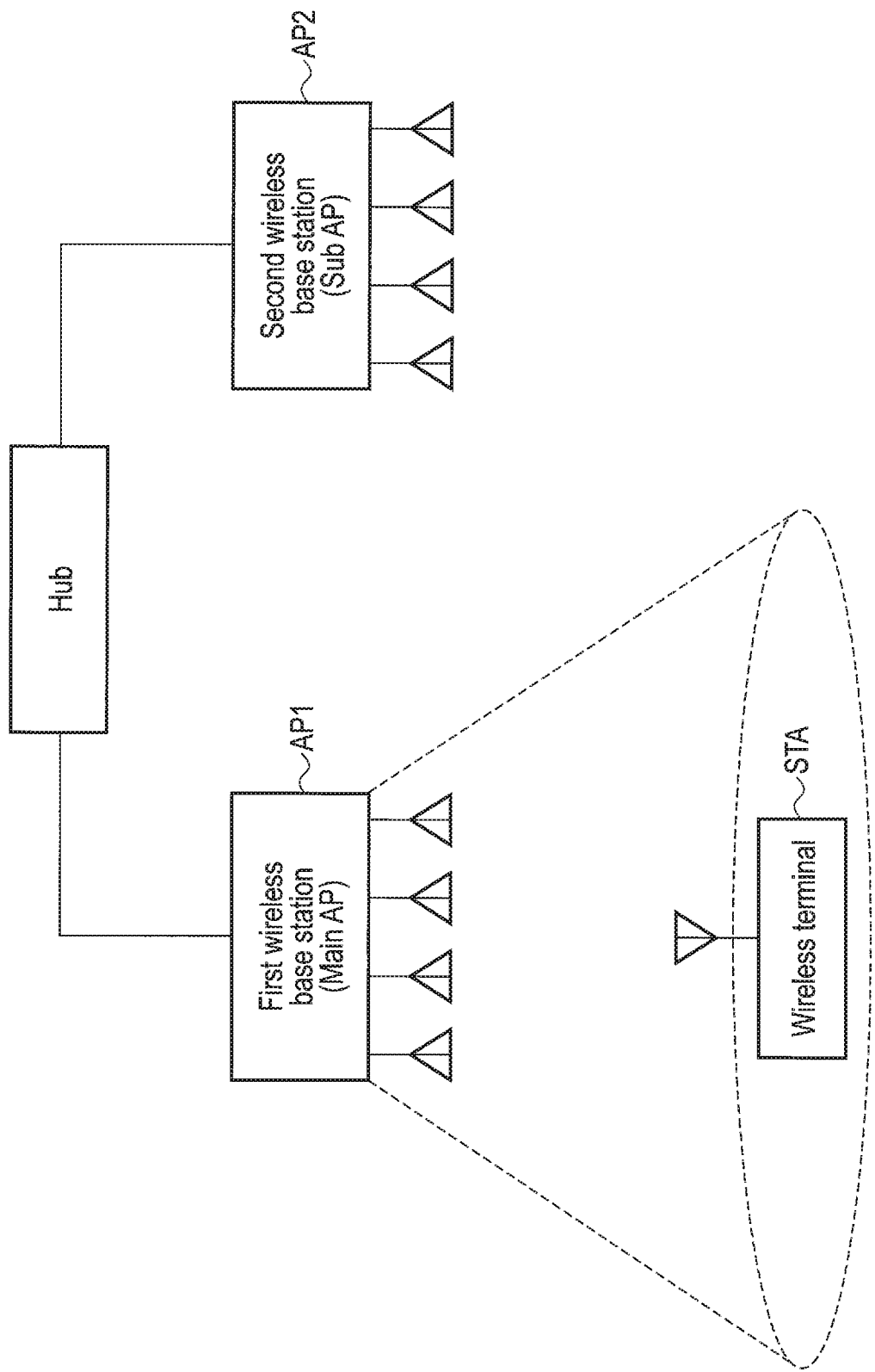
F I G. 1

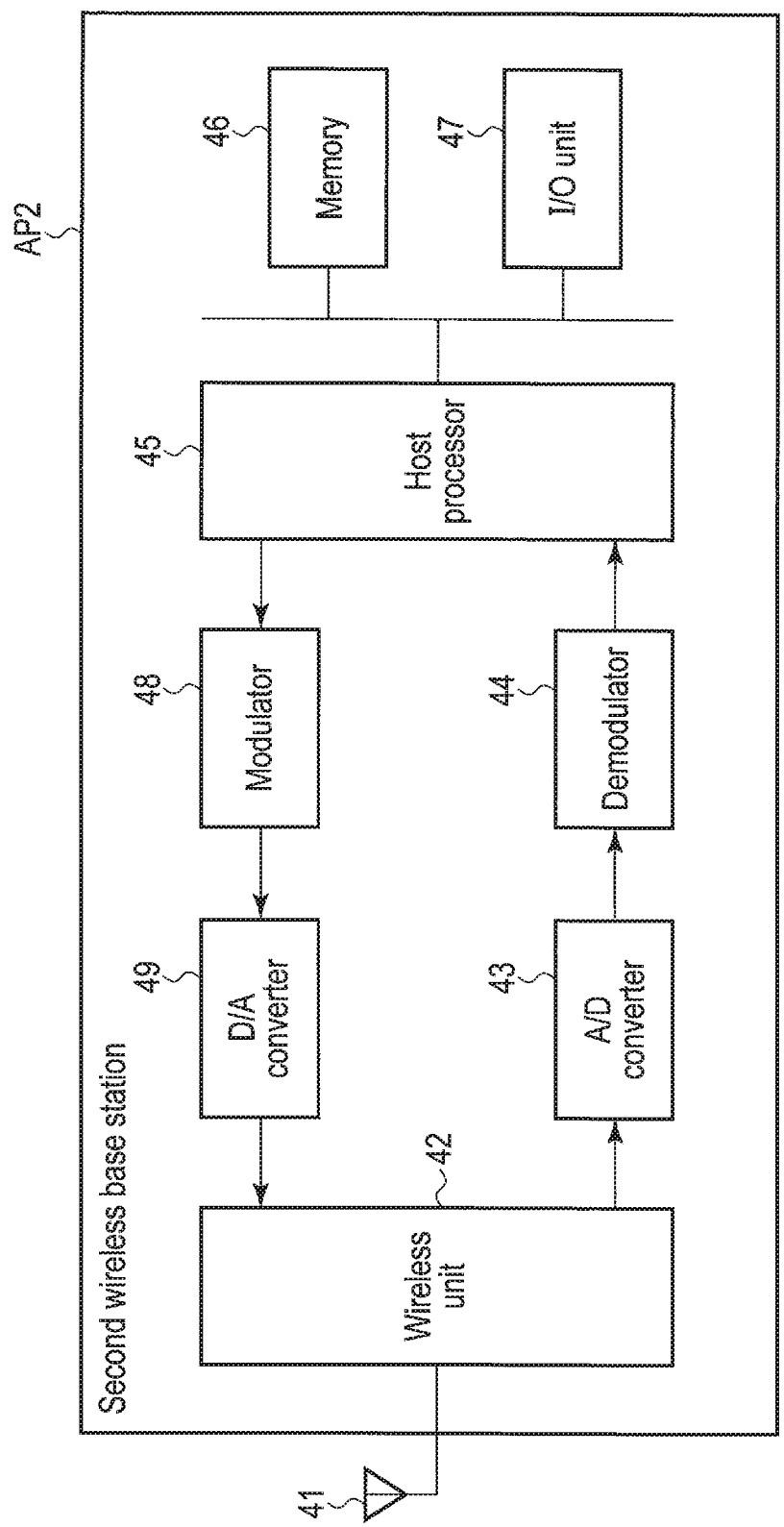
F I G. 5

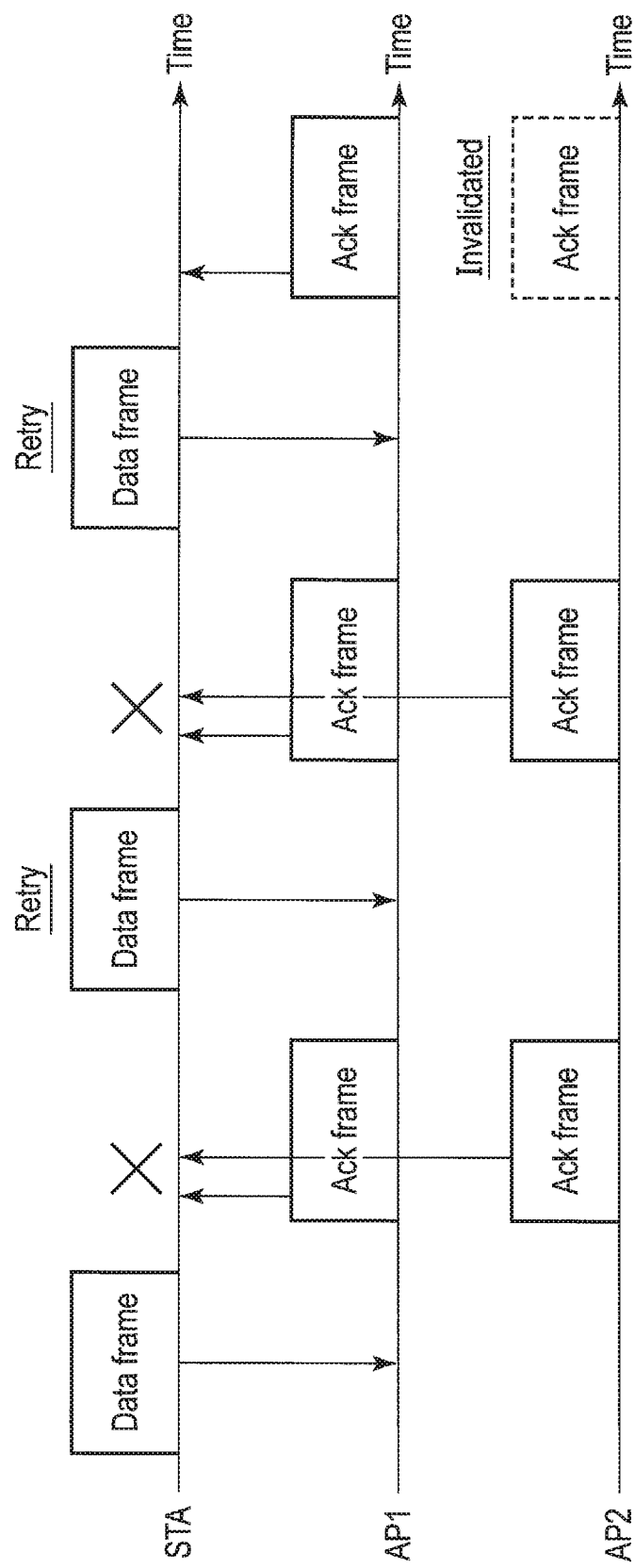
F I G. 9

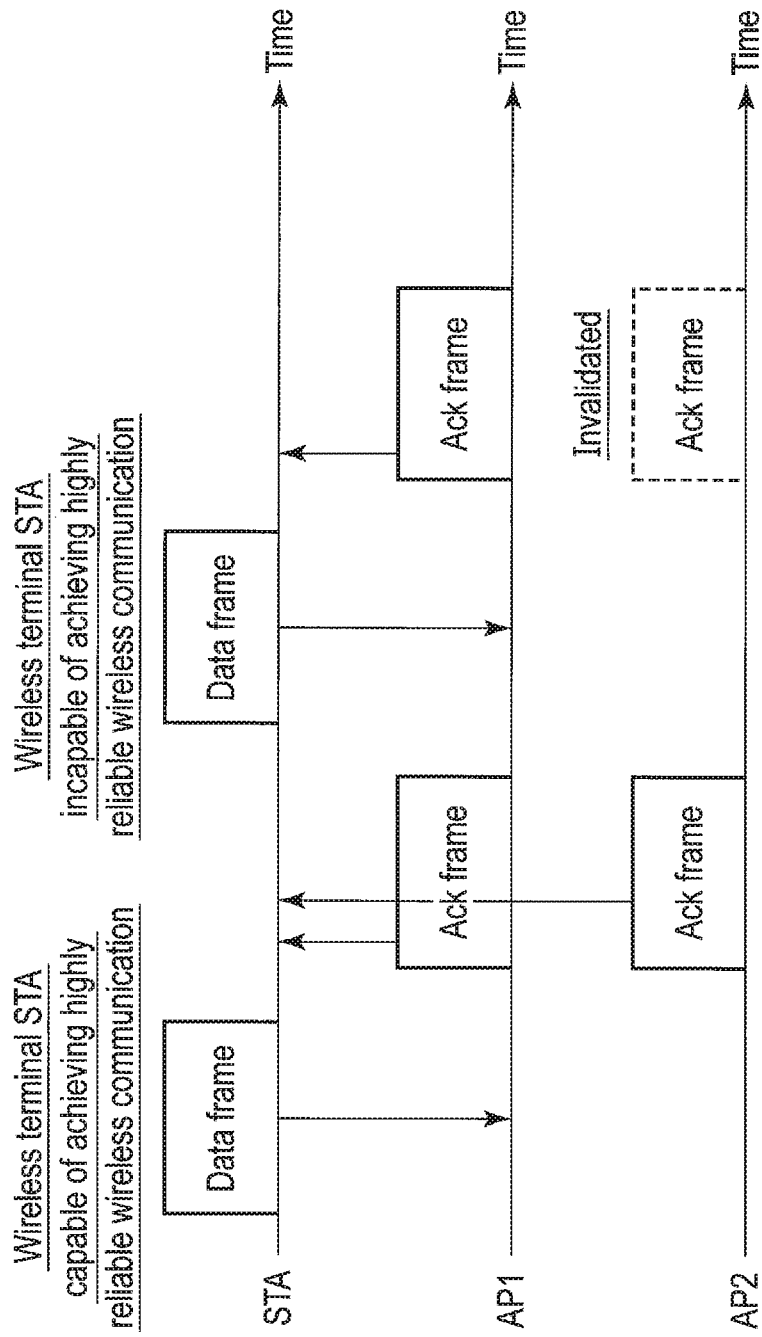
F I G. 10

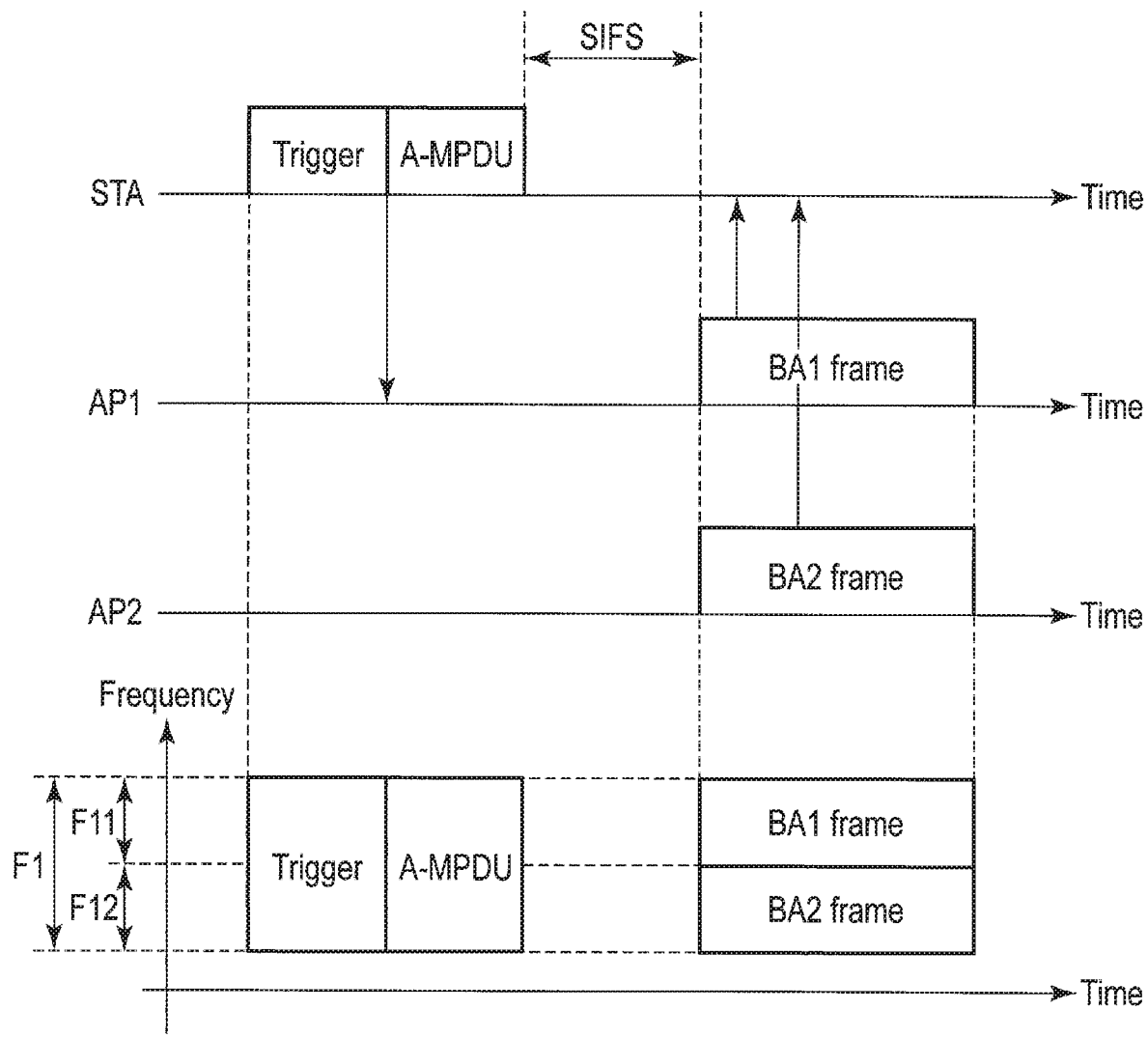
F I G. 12

ELECTRONIC APPARATUS

CROSS-REFERENCE TO RELATED APPLICATIONS

This application is based upon and claims the benefit of priority from Japanese Patent Application No. 2018-161575, filed Aug. 30, 2018, the entire contents of which are incorporated herein by reference.

FIELD

Embodiments described herein relate generally to an electronic apparatus.

BACKGROUND

In recent years, various techniques for improving reliability of communication have been proposed. One of those techniques is to transmit one piece of data to a plurality of wireless base stations simultaneously using one wireless terminal. With this technique, the wireless terminal can refer to responses from the plurality of wireless base stations, whereby the reliability of communication can be improved. However, with the technique described above, the wireless terminal sequentially refers to responses from the plurality of wireless base stations in a time-sharing manner, whereby there is a disadvantage that the overhead may be increased. Accordingly, there has been a demand for a new technique by which such inconvenience can be overcome.

BRIEF DESCRIPTION OF THE DRAWINGS

FIG. 1 illustrates an exemplary wireless communication environment according to one embodiment.

FIG. 5 illustrates an exemplary hardware configuration of an electronic apparatus according to the embodiment.

FIG. 9 is a diagram for illustrating further functions of the electronic apparatus according to the embodiment.

FIG. 10 is another diagram for illustrating further functions of the electronic apparatus according to the embodiment.

FIG. 12 is another diagram illustrating the outline of the other operation of the electronic apparatus according to the embodiment.

DETAILED DESCRIPTION

Figure 2:
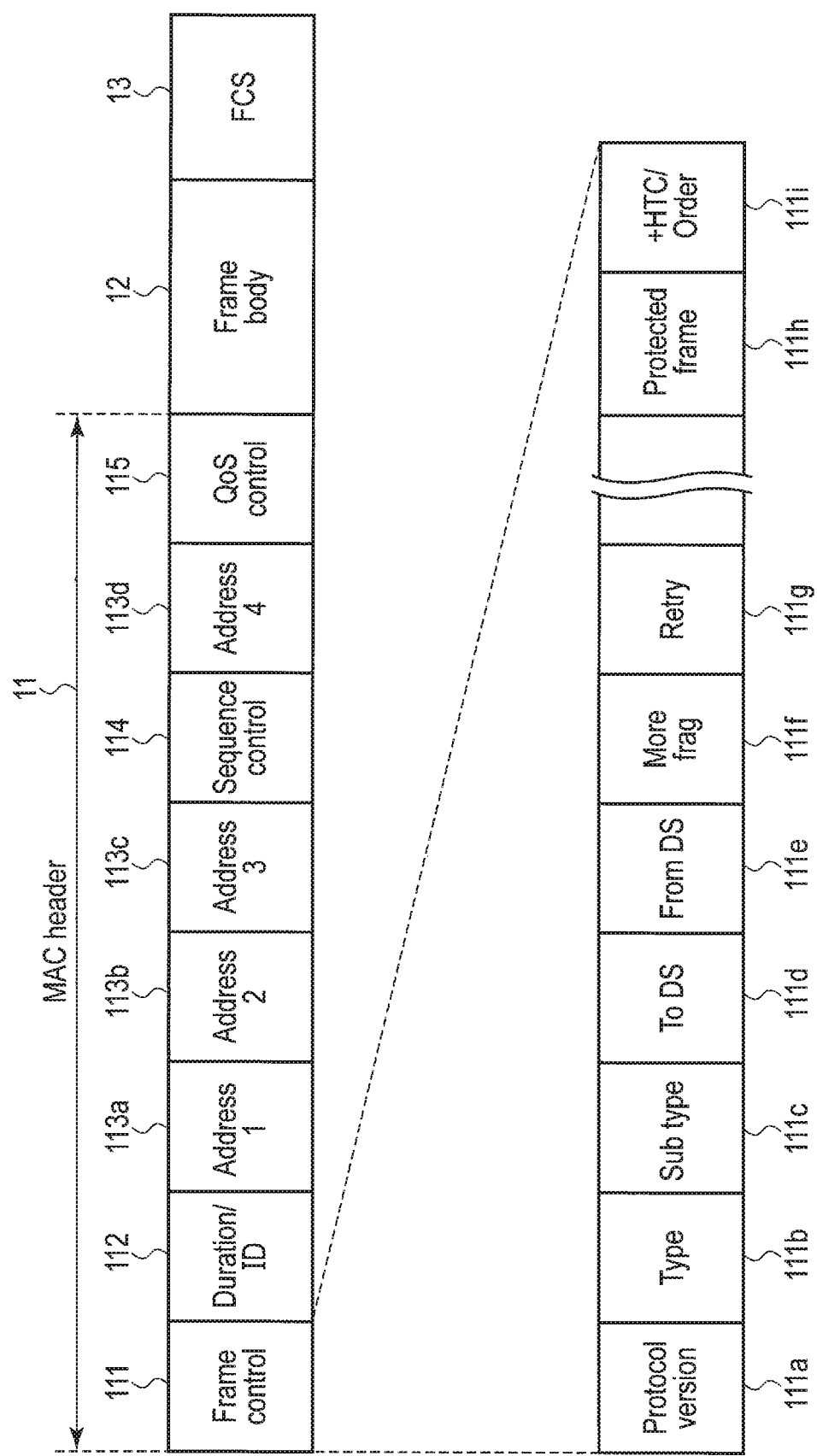
FIG. 2 illustrates an exemplary frame format of a media access control (MAC) frame used in a wireless communication environment according to the embodiment.

In general, according to one embodiment, an electronic apparatus includes a receiver and a transmitter. The receiver is configured to receive, from a first wireless apparatus, a first physical frame including a destination address receivable by a second wireless apparatus different from the electronic apparatus. The transmitter is configured to transmit, to the first wireless apparatus, a first response frame including first information regarding the first physical frame, if the first physical frame is successfully received. A transmission period of the first response frame at least partially overlaps with a transmission period of a second response frame, if the first physical frame is successfully received by the electronic apparatus and if the first physical frame is successfully received by the second wireless apparatus, the second response frame including second information regarding the first physical frame received by the second wireless apparatus.

Hereinafter, embodiments will be described with reference to the accompanying drawings. The present disclosure is merely an example, and the present invention is not limited to the contents described in the following embodiments. Naturally, modifications that can be easily conceived by those skilled in the art are included in the scope of the present disclosure. In order to make the descriptions clearer, there may be a case where a size, shape, and the like of each part are changed with respect to actual embodiments and schematically illustrated in the drawings. In a plurality of the drawings, corresponding elements are denoted by the same reference numerals, and detailed descriptions may be omitted.

In one exemplary mechanism for achieving highly reliable wireless communication, one wireless terminal transmits one piece of data to a plurality of wireless base stations simultaneously. When data from the wireless terminal is received, each wireless base station sequentially sends a response frame (Ack frame) back to the wireless terminal in a time-sharing manner. According to this mechanism, since the wireless terminal transmits one piece of data to a plurality of wireless base stations simultaneously, it becomes possible to refer to the Ack frames from the plurality of wireless base stations to determine whether the data is received by another wireless terminal, whereby wireless communication highly reliable for the wireless terminal can be achieved.

That is, in this mechanism, as the number of wireless base stations to be destinations of data transmitted from the wireless terminal increases, the reliability of the wireless communication can be improved. Meanwhile, as the number of wireless base stations to be destinations of data transmitted from the wireless terminal increases, the time required for receiving the Ack frame in the wireless terminal also increases, thereby increasing the overhead accordingly. In view of the above, there has been a demand for a new technique capable of performing highly reliable wireless communication without increasing the overhead.

In the present embodiment, the communication frame may also be referred to as a physical frame.

FIG. 1 illustrates a schematic configuration example of a wireless communication system (wireless communication environment) including an electronic apparatus according to one embodiment. The wireless communication system illustrated in FIG. 1 includes a wireless local area network (LAN) system including a wireless terminal station (STA) and a first wireless base station AP1 (also referred to as "main access point (AP)") communicably connected to the wireless terminal STA, and a second wireless base station AP2 (also referred to as "sub AP") different from the first wireless base station AP1. Note that the electronic apparatus according the present embodiment corresponds to the second wireless base station AP2. In the present embodiment, it is assumed that the wireless terminal STA is not connected to (associated with) the second wireless base station AP2.

Note that, although the wireless LAN system described above is assumed to be a network system in an infrastructure mode including one wireless base station AP and at least one wireless terminal STA in the present embodiment, it is not limited thereto, and may be a network system in an ad-hoc mode in which a plurality of wireless terminal STAs directly performs communication without interposing a wireless base station AP, for example. However, in this case, any one of the plurality of wireless terminal STAs is required to operate as an owner in the ad-hoc network. Further, the wireless base station AP included in the wireless LAN system is not necessarily a wireless base station fixed at a predetermined point. For example, a wireless terminal STA that functions as a simple wireless base station by changing an operation mode may be regarded as a wireless base station included in the wireless LAN system.

Note that the first and second wireless base stations AP1 and AP2 may be connected to a controller (not illustrated) via Ethernet (registered trademark). As will be described in detail later, this controller performs, on the first and second wireless base stations AP1 and AP2, setting of various parameters necessary for highly reliable wireless communication.

Hereinafter, before describing the second wireless base station AP2 capable of achieving highly reliable wireless communication for the wireless terminal STA, a frame format used in the wireless communication system illustrated in FIG. 1 will be described in order with reference to FIGS. 2 to 4.

FIG. 2 illustrates a frame format of a media access control (MAC) frame. As illustrated in FIG. 2, the MAC frame includes a MAC header 11, a frame body 12, and a frame check sequence (FCS) 13.

Information necessary for reception processing in the MAC layer is set in the MAC header 11. Information corresponding to a frame type is set in the frame body 12. An error detection code (cyclic redundancy code (CRC)) calculated to determine whether the MAC header 11 and the frame body 12 have been successfully received in a normal way is set in the FCS 13.

As illustrated in FIG. 2, the MAC header 11 includes a frame control field 111, a duration/ID field 112, a plurality of address fields 113a to 113d, a sequence control field 114, and a quality of service (QoS) control field 115. Note that the various fields included in the MAC header 11 are not limited to the fields mentioned above, and for example, a new field may be further added thereto, or some fields may be omitted therefrom.

A value corresponding to the frame type is set in the frame control field 111.

More specifically, as illustrated in FIG. 2, the frame control field 111 includes a protocol version field 111a, type field 111b, sub type field 111c, to distribution system (To DS) field 111d, From DS field 111e, more fragment field 111f, retry field 111g, protect field 111h, +HTC/order field 111i, and the like.

Information indicating a protocol version to be used is set in the protocol version field 111a.

Information associated with a type of the MAC frame is set in the type field 111b, which indicates whether the type of the MAC frame is a management frame, a control frame, or a data frame.

Information indicating the frame type within the frame type indicated by the type field 111b is set in the sub type field 111c.

Information associated with a destination is set in the To DS field 111d, which indicates whether the destination is the wireless base station AP or the wireless terminal STA. Specifically, it indicates that the destination is the wireless base station AP when the bit is "1", and indicates that the destination is the wireless terminal STA when the bit is "0".

Information associated with a transmission source is set in the From DS field 111e, which indicates whether the transmission source is the wireless base station AP or the wireless terminal STA. Specifically, it indicates that the transmission source is the wireless base station AP when the bit is "1", and indicates that the transmission source is the wireless terminal STA when the bit is "0".

The more fragment field 111f is used when a packet of the upper layer is fragmented and transmitted, and information indicating whether a fragment frame subsequently exists is set therein. Specifically, it indicates that a fragment frame subsequently exists when the bit is "1", and indicates that no fragment frame subsequently exists when the bit is "0".

Information indicating whether the frame is retransmitted (retransmitted frame) is set in the retry field 111g. Specifically, it indicates that the frame is a retransmitted frame when the bit is "1", and indicates that the frame is not the retransmitted frame when the bit is "0".

Information indicating whether the frame is encrypted is set in the protect field 111h. Specifically, it indicates that the frame is encrypted when the bit is "1", and indicates that the frame is not encrypted when the bit is "0".

The +HTC/order field 111i indicates that the order of frames should not be changed during frame relay in a case where a non-QoS data frame is transmitted, and indicates that the MAC header includes a high-throughput (HT) control field (not illustrated) in a case where a QoS data frame in an IEEE 802.11n/ac/ax physical frame is transmitted. When the HT control field is included, it is included between the QoS control field 115 and the frame body 12, and is used to notify a part of functions defined by IEEE 802.11n/ac/ax.

Note that the various fields included in the frame control field 111 are not limited to the fields mentioned above, and for example, a new field may be further added thereto, or some fields may be omitted therefrom.

The duration/ID field 112 has a length of 16 bits, and low-order 15 bits thereof indicate a network allocation vector (NAV) when the most significant bit (MSB) is "0", and a part of the low-order 15 bits indicate an identification number allocated to the wireless terminal STA connected to the wireless base station AP when the MSB is "1".

A MAC address of a direct receiving station is set in an address 1 field 113a, which is used in determining whether the frame is addressed to its own apparatus, for example. A MAC address of a direct transmitting station is set in an address 2 field 113b. In an address 3 field 113c, the MAC address of the apparatus to be the final destination is set in the uplink, and the MAC address of the apparatus as the transmission source is set in the downlink.

An address 4 field 113d is set only when the wireless base station AP transmits a frame to another wireless base station AP, and the MAC address of the apparatus as the transmission source is set therein.

The sequence control field 114 indicates a sequence number of a frame to be transmitted and a fragment number for a fragment.

The QoS control field 115 is a field added when the frame type indicated by the type field 111b is the data frame and the type of the MAC frame indicated by the sub type field 111c is QoS data. The QoS control field 115 includes a traffic ID (TID) field in which an identifier corresponding to data traffic is set, an Ack policy field in which an acknowledgment method is set, and the like. For example, the TID field is used in determining a data traffic type. Further, the Ack policy field is used in determining whether the QoS data is transmitted according to a normal Ack policy, a block Ack policy, or a no Ack policy.

Figure 3:
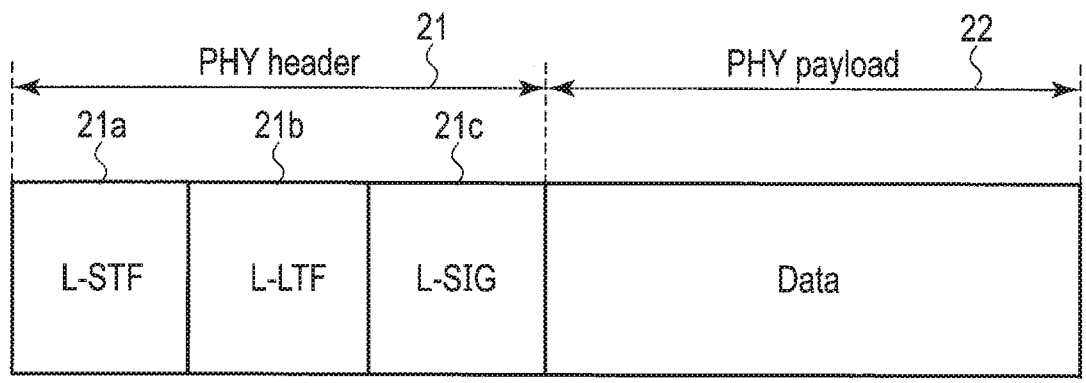
FIG. 3 illustrates an exemplary frame format of a physical (PHY) frame used in the wireless communication environment according to the embodiment.

FIG. 3 illustrates a frame format of a physical (PHY) frame. As illustrated in FIG. 3, the PHY frame includes a PHY header 21 and a PHY payload 22. As further illustrated in FIG. 3, the PHY header 21 includes a non-HT short training field (L-STF) 21a, a non-HT long training field (L-LTF) 21b, and a non-HT signal field (L-SIG) 21c.

The L-STF 21a and the L-LTF 21b indicate a known bit pattern. For example, the receiver that receives the frame refers to the bit pattern to perform receiving power adjustment, timing synchronization, channel estimation, and the like. Furthermore, the L-SIG 21c includes information indicating a transmission rate, information indicating a frame length, information regarding a bandwidth, and the like.

The PHY payload 22 includes information indicating a MAC frame having been subject to orthogonal frequency divisional multiplexing (OFDM) modulation processing. That is, the PHY payload 22 is a part corresponding to the MAC frame illustrated in FIG. 2.

Note that, although the frame format of the PHY frame defined by IEEE 802.11a is illustrated in FIG. 3, a frame format of the PHY frame defined by another IEEE 802.11 standard may be used in the wireless communication system illustrated in FIG. 1.

Figure 4:
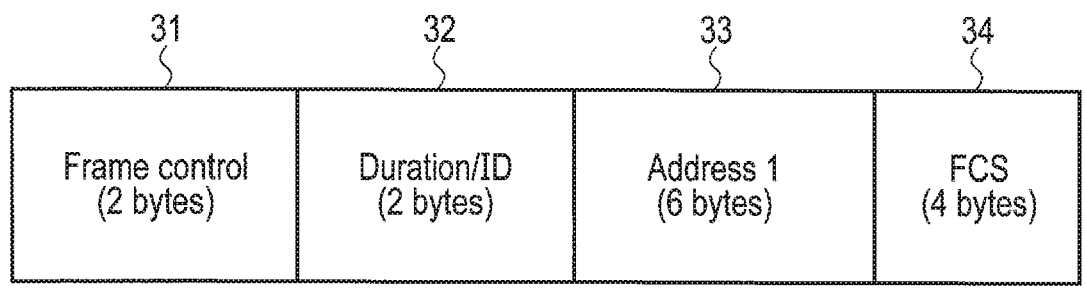
FIG. 4 illustrates an exemplary frame format of an acknowledgment (Ack) frame used in the wireless communication environment according to the embodiment.

FIG. 4 illustrates a frame format of the Ack frame. The Ack frame is a type of the MAC frame, which includes a frame control field 31, a duration/ID field 32, an address 1 field 33, and an FCS 34, as illustrated in FIG. 4. As the various fields 31 to 34 have already been described, detailed descriptions thereof will be omitted here. To briefly supplement the descriptions, in the case of the Ack frame, information indicating the Ack frame is set in the (type field and sub type field of) frame control field 31, and information indicating the destination of the Ack frame is set in the address 1 field 33.

The various frame formats used in the wireless communication system illustrated in FIG. 1 have been described above.

Next, a hardware configuration of the second wireless base station AP2 illustrated in FIG. 1 will be described with reference to FIG. 5. As illustrated in FIG. 5, the second wireless base station AP2 includes an antenna 41, a wireless unit 42, an A/D converter 43, a demodulator 44, a host processor 45, a memory 46, an I/O unit 47, a modulator 48, a D/A converter 49, and the like.

The host processor 45 is connected to the memory 46 and the I/O unit 47 via a bus. The host processor 45 may implement various functions to be described later by executing a program downloaded from an external apparatus by the I/O unit 47 and stored in the memory 46 (i.e., by software), may implement the various functions by hardware, or may implement the various functions by a combination of software and hardware.

The antenna 41 transmits and receives a wireless signal using, for example, a frequency in the 2.4 GHz band or the 5 GHz band. The wireless unit 42 converts the frequency of the wireless signal received by the antenna 41 into a signal in an appropriate frequency band. The A/D converter 43 converts the analog signal having been subject to the frequency conversion using the wireless unit 42 into a digital signal. The demodulator 44 executes, on the digital signal having been subject to the frequency conversion using the A/D converter 43, reception processing including demodulation and decode conforming to a predetermined standard (e.g., IEEE 802.11a, IEEE 802.11b, IEEE 802.11g, IEEE 802.11n, IEEE 802.11ac, and IEEE 802.11ax, including 802.11 standard to be defined in the future) to convert the digital signal into the MAC frame defined by the predetermined standard. The converted MAC frame is transferred to the host processor 45.

The demodulator 44 described above executes, on the digital signal converted by the A/D converter 43, OFDM symbol timing synchronization, fast Fourier transformation (FFT), deinterleaving, error correction decode, and the like as reception processing. The demodulator 44 also extracts information (PHY header information) included in the PHY header 21 described with reference to FIG. 3. The extracted PHY header information is transferred to the host processor 45. The configuration and its function used at the time of reception processing have been described above.

Next, a configuration and its function used at the time of transmission processing will be described.

The modulator 48 executes, on the MAC frame (e.g., Ack frame) transferred from the host processor 45, transmission processing including modulation and encode conforming to a predetermined standard to convert the MAC frame into a digital signal. Note that, as will be described in detail later, the host processor 45 notifies the modulator 48 of a PHY parameter to be used at the time of modulation. The D/A converter 49 converts the digital signal converted by the modulator 48 into an analog signal (baseband signal). The wireless unit 42 up-converts the baseband signal converted by the D/A converter 49 to a predetermined frequency band (e.g., 2.4 GHz band and 5 GHz band). The up-converted signal is transmitted to, as a wireless signal, the wireless terminal STA by the antenna 41.

Next, a functional unit implemented by a program stored in the memory 46 being executed by the host processor 45 will be described with reference to FIG. 6. Note that, although the case where various functional units are implemented by software is exemplified here, the various functional units may be implemented by hardware, or may be implemented by a combination of software and hardware, as described above.

Figure 6:
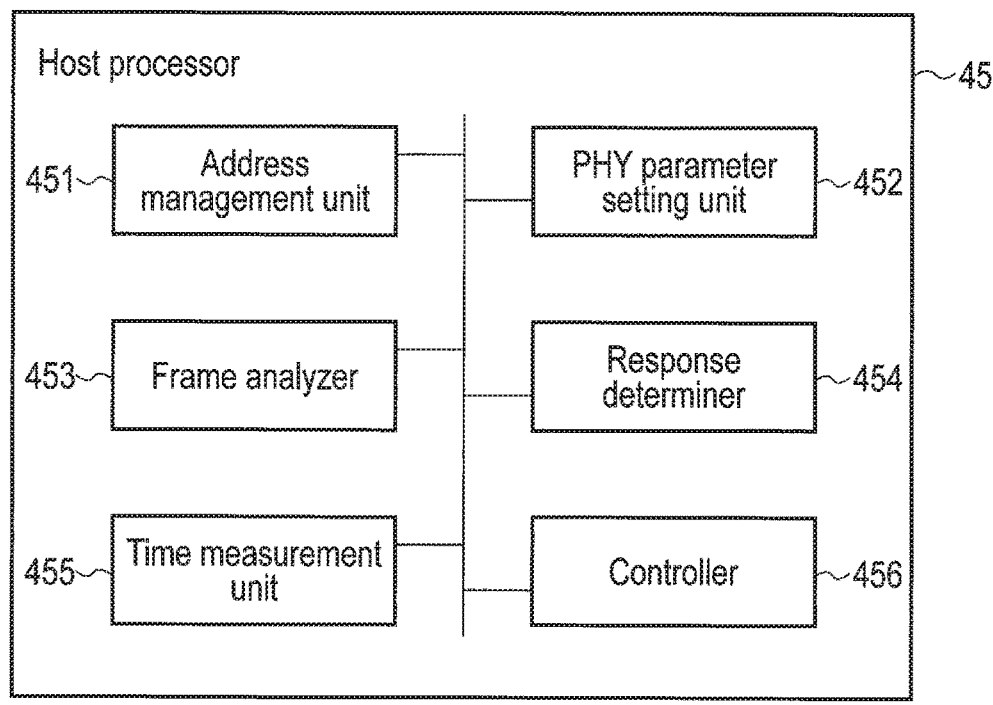
FIG. 6 illustrates an exemplary functional configuration of the electronic apparatus according to the embodiment.

As illustrated in FIG. 6, the host processor 45 includes an address management unit 451, a PHY parameter setting unit 452, a frame analyzer 453, a response determiner 454, a time measurement unit 455, controller 456, and the like.

The address management unit 451 manages the MAC address set in its own apparatus (own station).

The PHY parameter setting unit 452 generates a PHY parameter necessary for transmitting the Ack frame to the wireless terminal STA, and notifies the modulator 48 of the generated PHY parameter. The PHY parameter is a parameter used at the time when the modulator 48 performs modulation, which is, specifically, information indicating a transmission rate of the Ack frame, a length of the Ack frame (number of bytes), a scramble seed (scrambling sequence), and the like. Note that the PHY parameter setting unit 452 generates the PHY parameter that matches the PHY parameter used in the first wireless base station AP1. In addition, although the PHY parameter includes information indicating a scramble seed in the present embodiment, it is not limited thereto, and may be any parameter as long as it defines a manner of scrambling for generating at least part of the PHY frame, for example, the PHY payload.

Here, a method of generating (determining) the PHY parameter will be supplementarily described.

The transmission rate of the Ack frame indicated by the PHY parameter is determined in accordance with the standard of the wireless LAN. Specifically, the transmission rate of the Ack frame is determined to be a value equal to or smaller than the value of the transmission rate at the time when a received frame is transmitted (i.e., value of the transmission rate indicated by the PHY header information), and is also determined to be a value of the transmission rate highest among the essential rates. For example, in a case where the standard of the wireless LAN is IEEE 802.11a, there are eight types of available transmission rates, that is, 6, 9, 12, 18, 24, 36, 48, 54 [Mbps]. Among those eight types of transmission rates, three types of 6, 12, 24 [Mbps] are the transmission rates regarded as the essential rates.

Accordingly, for example, when the value of the transmission rate at the time when the received frame is transmitted is 24 to 54 [Mbps], 24 [Mbps] indicating the highest value among the essential rates of 24 [Mbps] or less is determined to be the transmission rate of the Ack frame. Likewise, when the value of the transmission rate at the time when the received frame is transmitted is 12 to 18 [Mbps], 12 [Mbps] indicating the highest value among the essential rates of 12 [Mbps] or less is determined to be the transmission rate of the Ack frame. Moreover, when the value of the transmission rate at the time when the received frame is transmitted is 6 to 9 [Mbps], 6 [Mbps] indicating the highest value among the essential rates of 6 [Mbps] or less is determined to be the transmission rate of the Ack frame.

The frame length of the Ack frame indicated by the PHY parameter is determined in accordance with the standard of the wireless LAN. Specifically, as exemplified in FIG. 4, the frame length of the Ack frame is 2 bytes for the frame control field 31, 2 bytes for the duration/ID field 32, 6 bytes for the address 1 field 33, and 4 bytes for the FCS 34, which is 14 bytes in total. The frame length of the Ack frame is not limited thereto, and can be defined in accordance with the standard of wireless communication.

The scramble seed indicated by the PHY parameter is determined to be the one same as the scramble seed inserted in the data frame transmitted from the wireless terminal STA (i.e., it is determined to be the scramble seed same as the scramble seed applied at the time when the wireless terminal STA transmits the data frame). Alternatively, the scramble seed is determined in accordance with an instruction from the controller mentioned above. Note that, since the PHY parameters need to match between the first and second wireless base stations AP1 and AP2 as described above, the instruction from the controller mentioned above is transmitted to the first and second wireless base stations AP1 and AP2 in common.

The various functional units will be described again.

The frame analyzer 453 performs analysis based on the MAC frame and the PHY header information transferred from the demodulator 44.

Specifically, the frame analyzer 453 extracts, from the address 1 field 113a included in the MAC frame transferred from the demodulator 44, the MAC address of the receiver that receives the MAC frame. The extracted MAC address is used to determine whether the transferred MAC frame is addressed to the own station.

Moreover, the frame analyzer 453 refers to the PHY header information transferred from the demodulator 44 to determine whether the MAC frame transferred from the demodulator 44 is an aggregate-MAC protocol data unit (A-MPDU) frame defined by the standard of IEEE 802.11 (e.g., IEEE 802.11n). Alternatively, the frame analyzer 453 refers to the (type field 111b and sub type field 111c of) frame control field 111 included in the MAC frame transferred from the demodulator 44 to determine whether the MAC frame is a block Ack request frame that requests a block Ack.

Note that, between the two methods of determination described above, the former one is a method of indirectly determining whether the MAC frame is the block Ack request frame, and the latter one is a method of directly determining whether the MAC frame is the block Ack request frame.

Further, the frame analyzer 453 refers to the (type field 111b of) frame control field 111 included in the MAC frame transferred from the demodulator 44 to determine whether the MAC frame is a data frame. Furthermore, the frame analyzer 453 calculates a checksum based on the MAC frame transferred from the demodulator 44 to determine whether the calculated checksum and the checksum set (specified) in the MAC frame are identical (i.e., it is determined whether the MAC header 11 and the frame body 12 have been successfully received).

The response determiner 454 determines whether the wireless signal transmitted from the wireless terminal STA (i.e., MAC frame transferred from the demodulator 44) has been transmitted to the own station. Specifically, the response determiner 454 compares the MAC address of the own station, which is managed by the address management unit 451, with the MAC address extracted by the frame analyzer 453 to determine whether the two MAC addresses match, thereby determining whether it is transmitted to the own station.

When it is determined that the Ack frame should be returned to the wireless terminal STA, the time measurement unit 455 measures the elapsed time from the end of the received frame (i.e., MAC frame transferred from the demodulator 44), and when the period of time referred to as short inter-frame spacing (SIFS) has elapsed, notifies the host processor 45 of the status. The SIFS indicates the shortest latency time until the Ack frame is returned, which is, for example, 16 [μsec]. Upon reception of the notification, the host processor 45 notifies the modulator 48 of an instruction to transmit the Ack frame.

The controller 456 controls the various functional units 451 to 455 described above.

Next, exemplary operation executed by the second wireless base station AP2 having the configuration illustrated in FIGS. 5 and 6 to achieve highly reliable wireless communication for the wireless terminal STA will be described. Note that the exemplary operation of the second wireless base station AP2 in the case where the wireless terminal STA transmits the wireless signal (in this case, data frame) addressed to the first wireless base station AP1 in the wireless communication environment illustrated in FIG. 1 will be described here.

When the wireless terminal STA transmits the data frame addressed to the first wireless base station AP1, normally, only the first wireless base station AP1 returns the Ack frame to the wireless terminal STA. However, as schematically illustrated in FIG. 7, in the case where the data frame, which is originally addressed to another station, is recognized as the data frame addressed to the own station, the second wireless base station AP2 according to the present embodiment executes the operation of returning the Ack frame to the wireless terminal STA after the period of time referred to as SIFS has elapsed from the end of the data frame.

The transmission timing of the Ack frame by the second wireless base station AP2 is preferably controlled not to exceed the guard interval time of the Ack frame (e.g., 0.8 μsec according to the standard of IEEE 802.11a, and predetermined time length defined by another standard) with respect to the transmission timing of the Ack frame by the first wireless base station AP1 (i.e., in the example of the standard of IEEE 802.11a, the timing is preferably controlled such that the difference is 0.8 μsec or less when it is transmitted earlier than the Ack frame transmitted by the first wireless base station AP1 and the difference is 0.8 μsec or less when it is transmitted later). Accordingly, the period of time in which the Ack frame is transmitted by the first wireless base station AP1 and the period of time in which the Ack frame is transmitted by the second wireless base station AP2 at least partly overlap each other.

The guard interval indicates time for creating an interval between consecutive OFDM symbols in the physical frame, which is a mechanism for making the preceding and following OFDM symbol signals less likely to overlap each other due to the influence of multipath or the like.

Figure 7:
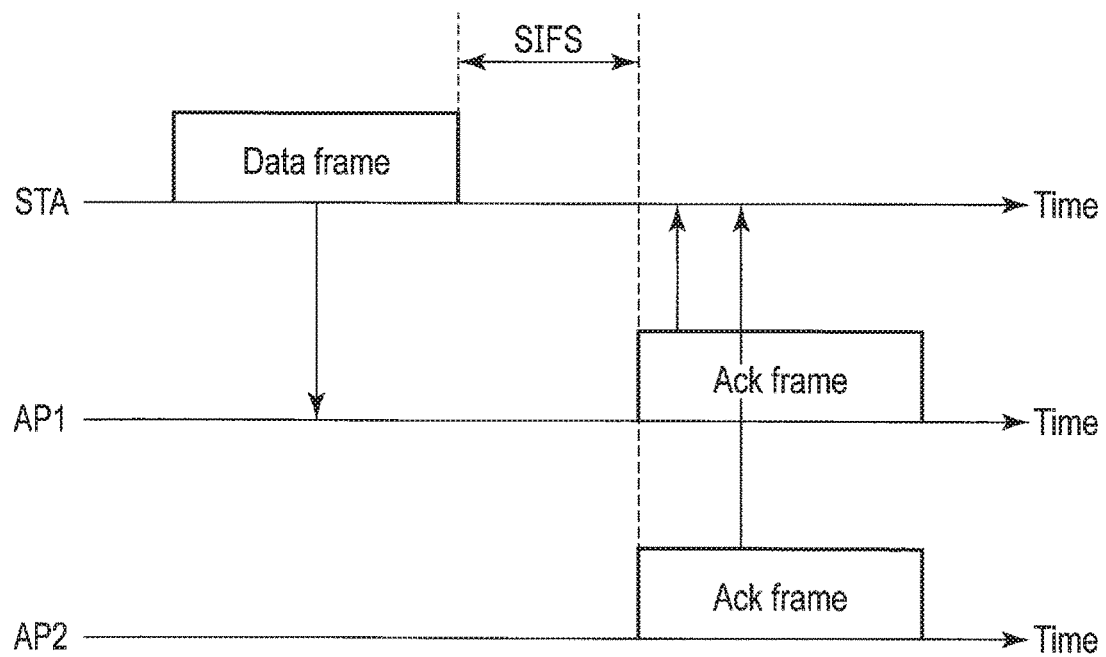
FIG. 7 illustrates an outline of operation of the electronic apparatus according to the embodiment.
Figure 8:
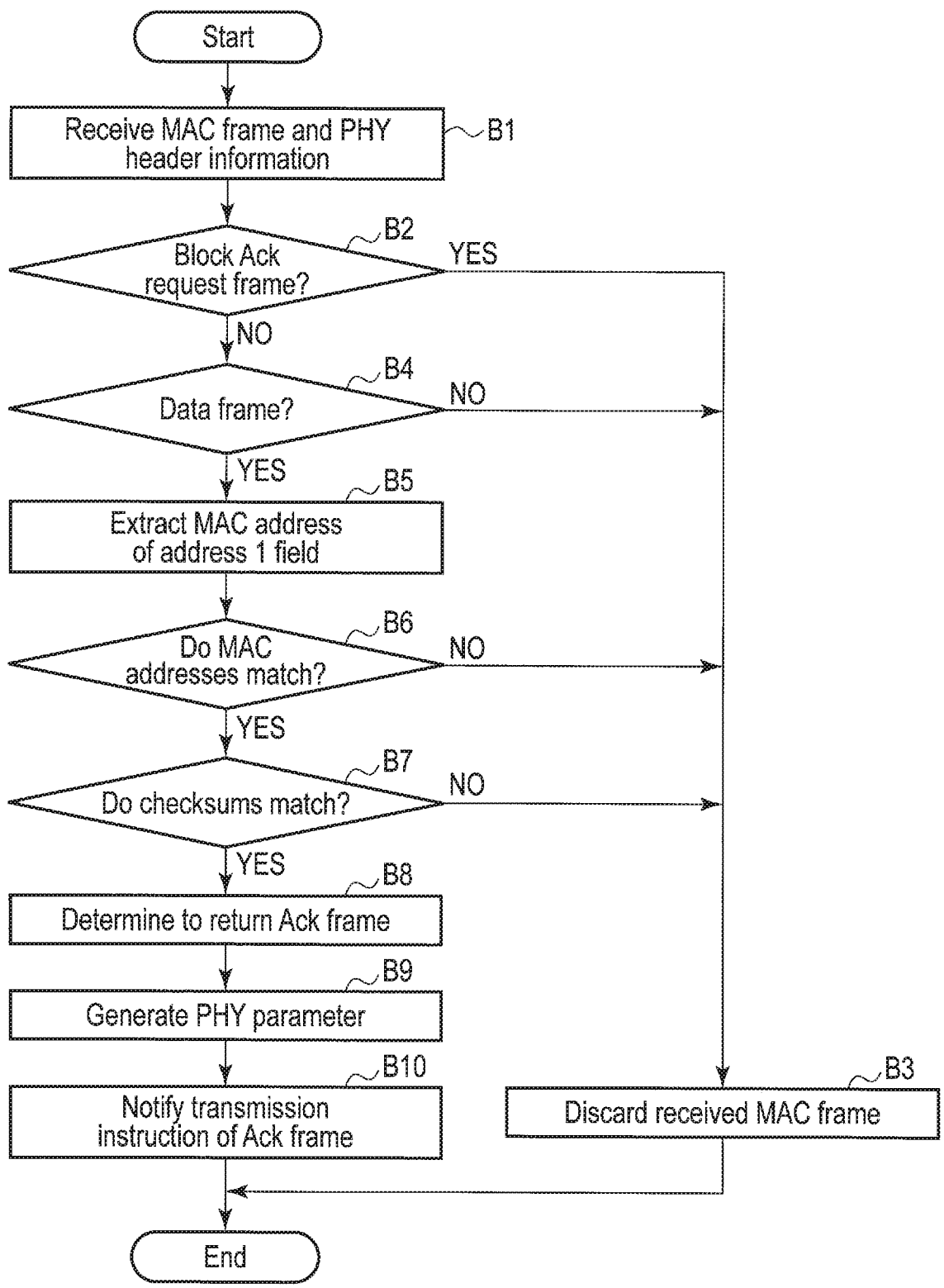
FIG. 8 is a flowchart illustrating an example of the operation of the electronic apparatus according to the embodiment.

FIG. 8 is a flowchart for illustrating the operation of the second wireless base station AP2 schematically illustrated in FIG. 7 in more detail.

First, the second wireless base station AP2 receives the wireless signal addressed to the first wireless base station AP1 via the antenna 41. Thereafter, the second wireless base station AP2 converts the received wireless signal into a MAC frame using the wireless unit 42, the A/D converter 43, and the demodulator 44, and transfers it to the host processor 45. At this time, the demodulator 44 extracts the PHY header information included in the PHY header 21 of the received frame, and also transfers the extracted PHY header information to the host processor 45.

As a result, the host processor 45 of the second wireless base station AP2 receives the MAC frame addressed to the first wireless base station AP1, and also receives the input of the PHY header information extracted by the demodulator 44 (block B1).

Next, the frame analyzer 453, which is a functional unit of the host processor 45, determines whether the received MAC frame is a block Ack request frame (i.e., the frame analyzer 453 determines whether the received MAC frame includes a plurality of data frames) (block B2). As described above, the method of determining whether the MAC frame is the block Ack request frame may be an indirect method of determining whether the MAC frame is an A-MPDU frame by referring to the PHY header information transferred from the demodulator 44, or may be a direct method of determination by referring to the frame control field 111 of the MAC frame.

If it is determined that the received MAC frame is a block Ack request frame (YES in block B2), the host processor 45 determines not to return the Ack frame to the wireless terminal STA, discards the received MAC frame (block B3), and terminates the series of operations here.

On the other hand, if it is determined that the received MAC frame is not a block Ack request frame (NO in block B2), the frame analyzer 453 refers to the frame control field 111 of the received MAC frame to determine whether the MAC frame is a data frame (block B4). If it is determined that the received MAC frame is not a data frame (NO in block B4), the host processor 45 executes the processing of block B3 described above, and terminates the series of operations here.

If it is determined that the received MAC frame is a (single) data frame (YES in block B4), the frame analyzer 453 extracts the MAC address set in the address 1 field 113a of the received MAC frame (block B5). The extracted MAC address is transferred to the response determiner 454.

The response determiner 454 compares the MAC address transferred from the frame analyzer 453 with the MAC address of the own station managed by the address management unit 451 to determine whether those two MAC addresses match (block B6). If it is determined that the two MAC addresses do not match (NO in block B6), the host processor 45 executes the processing of block B3 described above, and terminates the series of operations here.

On the other hand, if it is determined that the two MAC addresses match (YES in block B6), the response determiner 454 notifies the frame analyzer 453 of the determination result. Upon reception of the notification from the response determiner 454, the frame analyzer 453 calculates a checksum based on the received MAC frame to determine whether the calculated checksum and the checksum set in the MAC frame match (block B7). If it is determined that the checksums do not match (NO in block B7), the host processor 45 executes the processing of block B3 described above, and terminates the series of operations here.

If it is determined that the checksums match (i.e., the MAC frame is successfully received) (YES in block B7), the (response determiner 454 of) host processor 45 determines to return the Ack frame to the wireless terminal STA, generates the Ack frame, and notifies the PHY parameter setting unit 452 and the time measurement unit 455 of the status (block B8). Upon reception of the notification, the time measurement unit 455 starts to measure the elapsed time from the end of the received MAC frame.

Subsequently, upon reception of the notification that the Ack frame is determined to be returned to the wireless terminal STA, the PHY parameter setting unit 452 generates the PHY parameter necessary for modulation processing for returning the Ack frame, and transfers it to the modulator 48 (block B9).

Thereafter, upon reception of the notification from the time measurement unit 455 that the period of time referred to as SIFS has elapsed, the host processor 45 notifies the modulator 48 of an instruction for transmitting the Ack frame, transfers the generated Ack frame (block B10), and terminates the series of operation here. As a result, the Ack frame is returned from the second wireless base station AP2 to the wireless terminal STA.

The wireless terminal STA calculates a checksum of each Ack frame returned from the first and second wireless base stations AP1 and AP2, and when each checksum matches the checksum set in each Ack frame, it is determined that the Ack frame has been successfully received in a normal manner.

Alternatively, the wireless terminal STA may determine that the Ack frame has been received when a certain wireless signal is detected after the SIFS has elapsed from the end of the transmitted data frame (when clear channel assessment (CCA) is determined to be in a busy state). It should be noted that the period of the busy state is equal to or longer than the length of the PHY preamble (e.g., 8 μsec) or the length of the PHY header (e.g., 20 μsec), and is equal to or shorter than the maximum transmission time of the Ack frame (e.g., 44

μsec), with the time point at which the SIFS has elapsed from the end of the transmitted data frame serving as a starting point.

Alternatively, the wireless terminal STA may check up to the PHY header of the frame being transmitted, and may determine that the Ack frame has been received when the frame length indicated by the PHY header is set to 14.

Furthermore, the wireless terminal STA may check the type field and the sub type field of the frame control field 31 included in the MAC frame being transmitted, and may determine that the Ack frame has been received when information indicating the Ack frame is set therein. Alternatively, the wireless terminal STA may check the address 1 field 33 included in the MAC frame being transmitted, and may determine that the Ack frame has been received when information indicating the MAC address of its own apparatus is set therein.

Note that, although several methods by which the wireless terminal STA determines that the Ack frame has been received have been described here, the methods described above may be used in optional combination.

In addition, as long as at least one of the Ack frames returned from the first and second wireless base stations AP1 and AP2 has been successfully received in a normal manner, even if the Ack frame from the other one has not been successfully received in a normal manner, the wireless terminal STA transmits a new next data frame without retransmitting the data frame having already been transmitted.

According to the series of operations described above, the second wireless base station AP2 can return the Ack frame to the data frame addressed to another station, whereby highly reliable wireless communication for the wireless terminal STA can be achieved. Moreover, since the wireless terminal STA does not transmit the data frame to the second wireless base station AP2, it is not necessary to sequentially receive the Ack frames from the first and second wireless base stations AP1 and AP2 in a time-sharing manner as in the conventional system described above, whereby an increase in overhead can be suppressed.

Note that, in order for the second wireless base station AP2 to return the Ack frame to the data frame addressed to the other station, as described in the block B6 described above, the MAC address set in the address 1 field 113*a* of the received MAC frame needs to match the MAC address managed by the address management unit 451. That is, the second wireless base station AP2 needs to recognize that the data frame addressed to the other station is a data frame addressed to its own station. Accordingly, in the present embodiment, the MAC address of the second wireless base station AP2 is set according to one of the following methods.

There is a first exemplary method of setting the MAC address of the second wireless base station AP2 to the MAC address same as the unique MAC address of the first wireless base station AP1. Note that the MAC address of the first wireless base station AP1 may be obtained from the first wireless base station AP1, and may be obtained via the controller described above.

According to this first setting method, the MAC address managed by the address management unit 451 is the same as the MAC address of the first wireless base station AP1, whereby the second wireless base station AP2 can recognize all data frames transmitted from the wireless terminal STA to the first wireless base station AP1, which is the other station, as data frames addressed to its own station.

There is a second exemplary method of setting two MAC addresses in the second wireless base station AP2. More specifically, there is a method by which a unique MAC address different from the unique MAC address of the first wireless base station AP1 is set as a first address and a MAC address common to the first wireless base station AP1, which is different from the unique MAC address of the first wireless base station AP1, is additionally set as a second address. That is, two MAC addresses are set in both of the first and second wireless base stations AP1 and AP2, respectively, and one of them is set to be a common MAC address.

Examples of a method of setting, as a second address, a common MAC address in the first and second wireless base stations AP1 and AP2 include a method using a local address. That is, a MAC address that functions as a global address is set as a first address, and a MAC address that functions as a local address is set as a second address. Specifically, the MAC address in which other fields are set in an appropriate byte sequence in the state where the global/local (G/L) bit is set to "1" is generated as a second address, which is set in the first and second wireless base stations AP1 and AP2. Note that the second address is generated by the controller described above, for example, and the first and second wireless base stations AP1 and AP2 are notified of the second address and set the second address.

According to this second setting method, the wireless terminal STA can achieve highly reliable wireless communication selectively in such a manner that the second address notified by the first wireless base station AP1 is used as a destination only when the highly reliable wireless communication is desired while the first address notified by the first wireless base station AP1 is used as a destination when the highly reliable wireless communication is not required. That is, the second wireless base station AP2 can recognize, instead of recognizing that all data frames transmitted from the wireless terminal STA to the first wireless base station AP1 are data frames addressed to its own station, that the data frame transmitted to the first wireless base station AP1 is the data frame addressed to its own station as necessary.

There is a third exemplary method of setting the MAC address of the second wireless base station AP2 to be serial-numbered with the unique MAC address of the first wireless base station AP1 (i.e., there is the third exemplary method of setting the MAC address of the second base station AP2 to be different from an address of the first wireless base station AP1 by a value of at least one bit). In this method, the address management unit 451 of the second wireless base station AP2 manages mask bits capable of specifying bits not to be compared in the processing of the block B6 described above together with the MAC address.

This method will be concretely described. For example, in the case where the MAC address of the first wireless base station AP1 is "AB:CD:E0:00:12:34", the MAC address of the second wireless base station AP2 is set to "AB:CD:E0:01:12:34". At this time, the address management unit 451 manages "00:00:00:01:00:00" as a mask bit. The mask bit indicates that the MAC address of the bit position where "1" is set is not compared (treated as "Don't care"). Accordingly, the MAC address "AB:CD:E0:00:12:34" of the first wireless base station AP1 and the MAC address "AB:CD:E0:01:12:34" of the second wireless base station AP2 are substantially the same in the processing of the block B6 described above, whereby the second wireless base station AP2 can recognize the data frame addressed to the first wireless base station AP1, which is the other station, as a data frame addressed to its own station. Note that, although the exemplary case where the serial number included in the MAC address is masked by the mask bit has been described here, it is not limited thereto, and an arbitrary bit may be masked by the mask bit.

According to this third setting method, the effect similar to that in the case of the first setting method described above can be obtained. Further, by dynamically changing the mask bit (e.g., "00:00:00:01:00:00" is set at one point in time and "00:00:00:00:00:00" is set at another point in time), the effect similar to that in the case of the second setting method can be obtained.

Note that, although the data frame addressed to the other station indicates the data frame addressed to the first wireless base station AP1 different from the own station from the viewpoint of the second wireless base station AP2 in the present embodiment, it is not limited thereto, and for example, a data frame addressed to a MAC address different from the first address in the second method described above (e.g., second address) may be referred to as a data frame addressed to the other station. Furthermore, a data frame transmitted to a wireless base station (in this case, first wireless base station AP1) to which the wireless terminal STA is connected (associated) may be referred to as a data frame addressed to the other station.

In order to cause a plurality of wireless base stations to receive the data frame transmitted by the wireless terminal STA, a method of setting, to the first address of the data frame, a group address such as broadcast is available. However, it is preferable to set a unicast address in the first address. The reason is that, for example, in the case where the first address of the data frame is a group address, a wireless apparatus that does not need to receive the data frame also receives the data frame so that excess operation power is wasted, and that an additional mechanism for the wireless base station to transmit a response frame to a broadcast data frame is not necessary in the case of a unicast data frame. Meanwhile, the method of setting, to the first address of the data frame, a group address such as broadcast has advantages such as ease of implementation.

Moreover, although the PHY parameter is the information indicating the transmission rate of the Ack frame, the frame length of the Ack frame, and the scramble seed in the present embodiment, it is not limited thereto, and the PHY parameter may further indicate the following information.

For example, in the case where the first and second wireless base stations AP1 and AP2 have multiple antennas (multiple-input and multiple-output (MIMO) function), the PHY parameter may further indicate the number of streams and the number of antennas. In general, in the case where the wireless base station AP has the MIMO function and transmission in which the number of antennas is larger than the number of streams of the transmission frame (Ack frame) is performed, performing cyclic shift is defined by the standard of IEEE 802.11. Accordingly, occurrence of unintended directivity can be avoided. However, when the cyclic shift is performed, the multipath is recognized to be lengthened on the side of the wireless terminal STA, whereby there is a possibility that the multipath exceeds the guard interval. Accordingly, there is a possibility that the wireless terminal STA erroneously recognize that interference is occurring. Therefore, by matching the number of streams and the number of antennas using the PHY parameter, occurrence of the situation mentioned above can be suppressed.

Alternatively, the PHY parameter may further indicate a deviation of the center frequency from the wireless terminal STA. In general, even when the wireless base station AP and the wireless terminal STA use the same frequency channel, a deviation of the center frequency occurs not infrequently. Therefore, by analyzing the deviation of the center frequency to set it as the PHY parameter, at the time when the Ack frame is returned to the wireless terminal STA, the first and second wireless base stations AP1 and AP2 can return the Ack frame after correcting the deviation of the center frequency.

In addition to the functions described above, as exemplified in FIG. 9, the second wireless base station AP2 may have a function of determining, when a retransmitted frame addressed to the other station is consecutively received from the wireless terminal STA a predetermined number of times, that the Ack frame transmitted by its own may have an adverse effect and stopping returning the Ack frame to the retransmitted frame. Note that the second wireless base station AP2 can determine, by referring to the retry field 111g of the frame control field 111 included in the data frame addressed to the other station, whether the data frame is a retransmitted frame. Alternatively, the second wireless base station AP2 may refer to the sequence control field 114 included in the data frame addressed to the other station to determine whether the frame having the same sequence number has been received a predetermined number of times or more, thereby determining whether the data frame is a retransmitted frame. Further, the second wireless base station AP2 may refer to the retry field 111g of the frame control field 111 and the sequence control field 114 included in the data frame addressed to the other station to determine whether the retry field 111g indicates "1" and the frame having the same sequence number has been received a predetermined number of times or more, thereby determining whether the data frame is a retransmitted frame.

Furthermore, as illustrated in FIG. 10, the second wireless base station AP2 may further have a function of, by recognizing beforehand the MAC address of the wireless terminal STA incapable of achieving highly reliable wireless communication even when the Ack frame is returned, not returning the Ack frame to the data frame transmitted from the wireless terminal STA. For example, the MAC address of the wireless terminal STA incapable of achieving highly reliable wireless communication may be set in advance in the second wireless base station AP2 by the controller. Alternatively, the second wireless base station AP2 may generate a list of the MAC addresses of the wireless terminal STAs incapable of achieving highly reliable wireless communication from information associated with a past wireless communication history (e.g., information indicating that the repetition at which the wireless terminal STA retransmits the data frame exceeds a predetermined number of times even when the second wireless base station AP2 returns the Ack frame). Note that the second wireless base station AP2 refers to the address 2 field 113b included in the data frame addressed to the other station so that the MAC address of the wireless terminal STA that has transmitted the data frame can be grasped, whereby the second wireless base station AP2 can determine whether the wireless terminal STA is a wireless terminal STA incapable of achieving highly reliable wireless communication.

Figure 11:
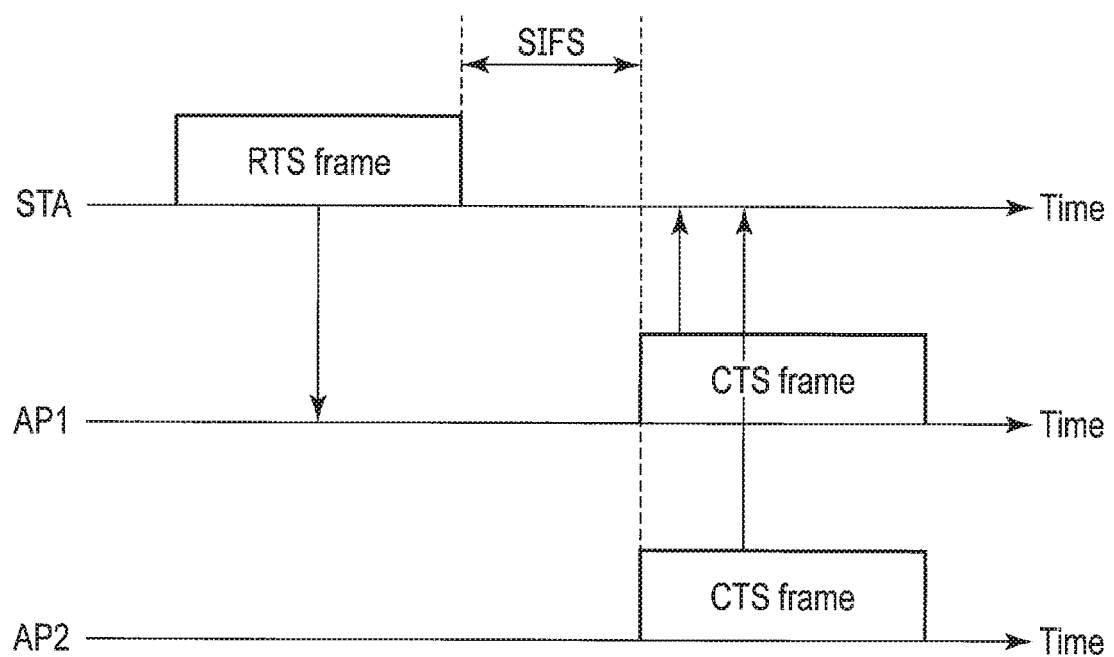
FIG. 11 is a diagram illustrating an outline of another operation of the electronic apparatus according to the embodiment.

Although the case where the second wireless base station AP2 recognizes the data frame transmitted from the wireless terminal STA to the first wireless base station AP1, which is the other station, as a data frame addressed to its own station and returns the Ack frame has been described in the present embodiment, the second wireless base station AP2 may recognize a request to send (RTS) frame transmitted from the wireless terminal STA to the first wireless base station AP1, which is the other station, as an RTS frame addressed to its own station and returns a clear to send (CTS) frame, as exemplified in FIG. 11. Note that both the RTS frame and the CTS frame are frames for reserving a communication period for transmitting the next data frame.

Furthermore, although the case where the second wireless base station AP2 recognizes the data frame transmitted from the wireless terminal STA to the first wireless base station AP1, which is the other station, as a data frame addressed to its own station and returns the Ack frame has been described in the present embodiment, the second wireless base station AP2 may recognize a trigger frame and an A-MPDU frame transmitted from the wireless terminal STA to the first wireless base station AP1, which is the other station, as a frame addressed to its own station and returns a block Ack frame, as exemplified in FIG. 12. The block Ack frame is a response frame including information regarding acknowledgment of transmission to at least one of a plurality of data frames included in the A-MPDU frame. In this case, as illustrated in FIG. 12, the second wireless base station AP2 uses a frequency position different from the frequency position instructed by the trigger frame (i.e., using a frequency different from that of the first wireless base station AP1) to return the block Ack frame to the wireless terminal STA. Note that the PHY headers of the block Ack frames returned from the first and second wireless base stations AP1 and AP2 are the same. The trigger frame is a frame for instructing a frequency used for transmitting the block Ack frame as described above.

In the situation where the wireless terminal STA recognizes the existence of the second wireless base station AP2 beforehand, the wireless terminal STA may instruct, using the trigger frame, a frequency position used by the first wireless base station AP1 and a frequency position used by the second wireless base station AP2, respectively. In this case, the first and second wireless base stations AP1 and AP2 use the frequency position instructed by the trigger frame to return the block Ack frame to the wireless terminal STA.

Figure 13:
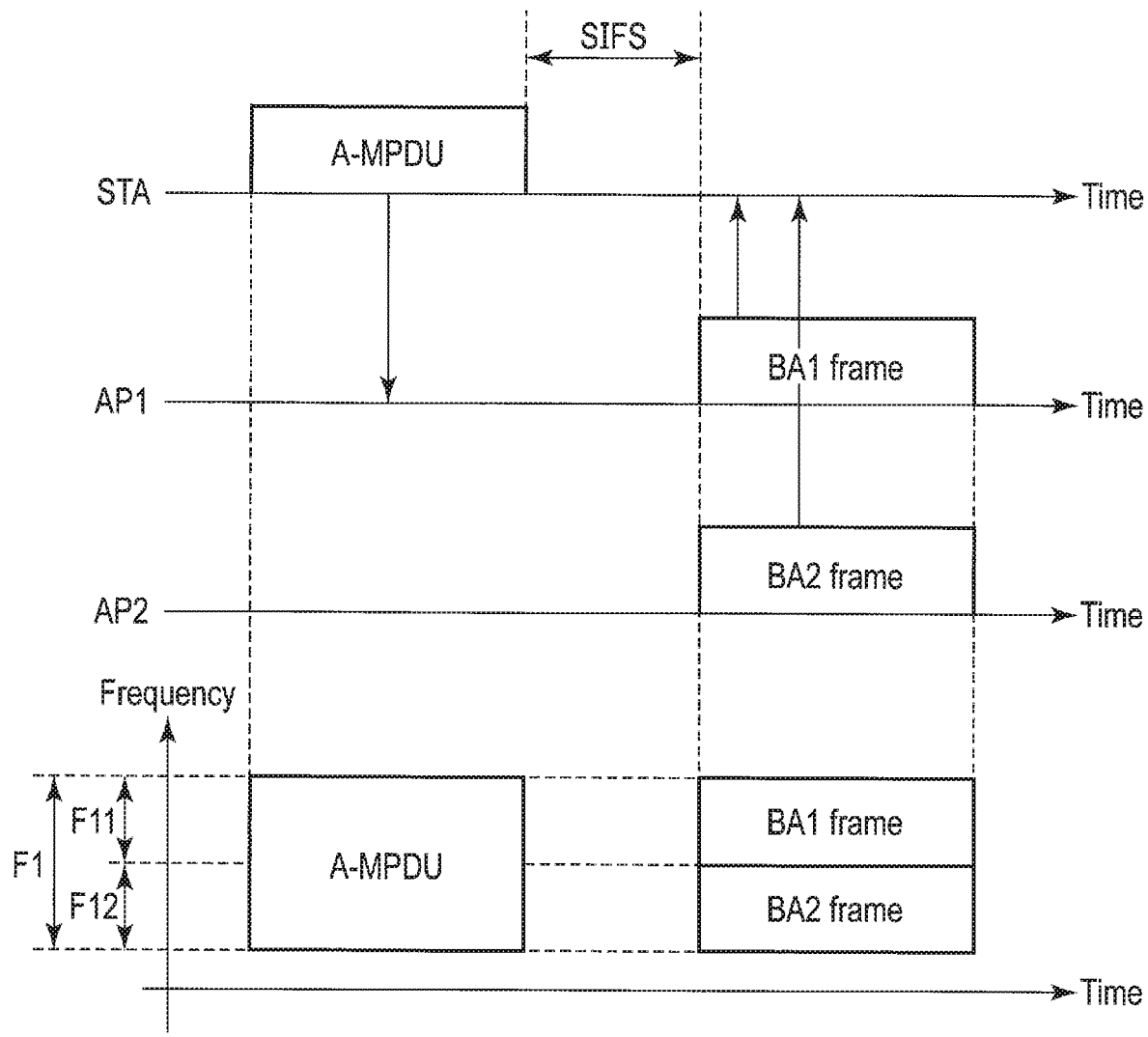
FIG. 13 is still another diagram illustrating the outline of the other operation of the electronic apparatus according to the embodiment.

Note that, in the case where the controller described above notifies the first and second wireless base stations AP1 and AP2 of the frequency to be used for transmitting the block Ack frame beforehand, the wireless terminal STA may not transmit the trigger frame, as illustrated in FIG. 13.

According to the embodiment described above, it is possible to achieve highly reliable wireless communication while an increase in overhead is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a receiver configured to receive, from a first wireless apparatus, a first physical frame including, as a destination address, an address specifying both (1) the electronic apparatus and (2) a second wireless apparatus different from the electronic apparatus as destinations; and
a transmitter configured to transmit, to the first wireless apparatus, a first response frame in response to reception of the first physical frame, if the first physical frame is successfully received by the receiver,
wherein a transmission period of the first response frame at least partially over laps with a transmission period of a second response frame transmitted by the second wireless apparatus in response to reception of the first physical frame,
wherein the transmitter is further configured to generate a physical header of the first response frame same as a physical header of the second response frame and to transmit the first response frame based on a PHY parameter same as a PHY parameter of the second wireless apparatus,
wherein the first physical frame includes a first request to send (RTS) frame for reserving a communication period,
wherein the first response frame is a first clear to send (CTS) frame for reserving the communication period, the first CTS frame including information regarding the first RTS frame, and
wherein the receiver is further configured to receive, if the first CTS frame is successfully received by the first wireless apparatus and a second CTS frame fails to be received by the first wireless apparatus, a transmission data frame during the communication period without receiving the first RTS frame again, the second CTS frame including information regarding the first RTS frame from the second wireless apparatus.

2. The electronic apparatus of claim 1, wherein: the first physical frame includes a first data frame, and the first response frame is a first acknowledgment frame including information regarding acknowledgment of the first data frame.

3. The electronic apparatus of claim 2, wherein the receiver is further configured to receive, if the first acknowledgment frame is successfully received by the first wireless apparatus and a second acknowledgment frame fails to be received by the first wireless apparatus, a next data frame different from the first data frame without receiving the first data frame again, the second acknowledgment frame including information regarding acknowledgment of the first data frame from the second wireless apparatus.

4. The electronic apparatus of claim 1, wherein: a transmission rate of the first and second response frames is the same, and the transmission rate of the first and second response frames is determined according to a transmission rate of the first physical frame.

5. The electronic apparatus of claim 1, wherein: a sequence used for scrambling at least part of physical frames of the first and second response frames is the same.

6. The electronic apparatus of claim 1, wherein: the first physical frame includes a first data frame and a second data frame, he first response frame is a first acknowledgment frame including information regarding acknowledgment of at least one of the first and second data frames, and the first acknowledgment frame includes a physical header same as a physical header of a second acknowledgment frame including information regarding acknowledgment of at least one of the first and second data frames from the second wireless apparatus.

7. The electronic apparatus of claim 6, wherein the first acknowledgment frame is transmitted to the first wireless apparatus using a first frequency different from a second frequency used if the second acknowledgment frame is transmitted by the second wireless apparatus.

8. The electronic apparatus of claim 1, wherein: a global address of the electronic apparatus is different from a global address of the second wireless apparatus, and a local address of the electronic apparatus is the same as a local address of the second wireless apparatus.

9. The electronic apparatus of claim 1, wherein: the first response frame is transmitted to the first wireless apparatus if the first physical frame includes a data frame, the first response frame including information regarding acknowledgment of the data frame; and the first response frame is not transmitted to the first wireless apparatus if the first physical frame includes a plurality of data frames.

10. The electronic apparatus of claim 1, wherein the first response frame is not transmitted to the first wireless apparatus if the first physical frame is received a predetermined number of times or more.

11. The electronic apparatus of claim 1, wherein: the second wireless apparatus establishes connection with the first wireless apparatus, and the electronic apparatus does not establish connection with the first wireless apparatus.

12. An electronic apparatus comprising:
a transmitter configured to transmit a first physical frame including an address specifying a first wireless apparatus as a destination; and
a receiver configured to receive, from the first wireless apparatus and a second wireless apparatus different from the first wireless apparatus which is a destination of the first physical frame, a response frame including information regarding the first physical frame if the first physical frame is successfully received by the first wireless apparatus,
wherein the receiver determines that the response frame has been received if a first wireless signal is detected after a lapse of a first period from an end of the first physical frame,
wherein the first physical frame includes a first request to send (RTS) frame for reserving a communication period,
wherein the response frame is a first clear to send (CTS) frame for reserving the communication period, the first CTS frame including information regarding the first RTS frame, and
wherein the transmitter is further configured to transmit, if the receiver successfully receives the first CTS frame from the first wireless apparatus and fails to receives a second CTS frame from the second wireless apparatus, a transmission data frame during the communication period without transmitting the first RTS frame again, the second CTS frame including information regarding the first RTS frame from the second wireless apparatus.

13. The electronic apparatus of claim 12, wherein the receiver determines is further configured to determine that the response frame has been received if a length of a frame obtained by executing reception processing on the first wireless signal is a first value.

14. The electronic apparatus of claim 12, wherein the receiver determines is further configured to determine that the response frame has been received if a type of the frame obtained by executing reception processing on the first wireless signal indicates the response frame.

15. The electronic apparatus of claim 12, wherein the receiver determines is further configured to determine that the response frame has been received if a destination of the frame obtained by executing reception processing on the first wireless signal is the own apparatus.

16. The electronic apparatus of claim 1, wherein the transmitter transmits the first response frame at a first transmission tinning, and the second wireless apparatus transmits the second response frame at a second transmission timing; and wherein the first transmission timing is determined in accordance with the second transmission timing to suppress a difference between the first transmission timing and the second transmission timing.

17. A communication method applied to an electronic apparatus comprising:
receiving, from a first wireless apparatus, a first physical frame including an address specifying both (1) the electronic apparatus and (2) a second wireless apparatus different from the electronic apparatus as destinations; and
transmitting, to the first wireless apparatus, a first response frame in response to reception of the first physical frame, if the first physical frame is successfully received,
wherein a transmission period of the first response frame at least partially overlaps with a transmission period of a second response frame transmitted by the second wireless apparatus in response to reception of the first physical frame,
wherein the transmitting includes generating a physical header of the first response frame same as a physical header of the second response frame and transmitting the first response frame based on a PHY parameter same as a PHY parameter of the second wireless apparatus,
wherein the first physical frame includes a first request to send (RTS) frame for reserving a communication period,
wherein the first response frame is a first clear to send (CTS) frame for reserving the communication period, the first CTS frame including information regarding the first RTS frame, and
wherein the communication method further comprises receiving, if the first CTS frame is successfully received by the first wireless apparatus and a second CTS frame fails to be received by the first wireless apparatus, a transmission data frame during the communication period without receiving the first RTS frame again, the second CTS frame including information regarding the first RTS frame from the second wireless apparatus.

18. A communication method comprising:
transmitting a first physical frame including an address specifying a first wireless apparatus as a destination;
receiving, from the first wireless apparatus and a second wireless apparatus different from the first wireless apparatus which is a destination of the first physical frame, a response frame including information regarding the first physical frame if the first physical frame is successfully received by the first wireless apparatus;
detecting a first wireless signal; and
determining that the response frame has been received if the first wireless signal is detected after a lapse of a first period from an end of the first physical frame,
wherein the first physical frame includes a first request to send (RTS) frame for reserving a communication period,
wherein the response frame is a first clear to send (CTS) frame for reserving the communication period, the first CTS frame including information regarding the first RTS frame, and
wherein the communication method further comprises transmitting, if the first CTS frame from the first wireless apparatus is successfully received and a second CTS frame from the second wireless apparatus is not received, a transmission data frame during the communication period without transmitting the first RTS frame again, the second CTS frame including information regarding the first RTS frame from the second wireless apparatus.

19. The electronic apparatus of claim 1, wherein the transmitter is further configured to transmit the first response frame based on a scramble seed same as a scramble seed of the second wireless apparatus.

* * * * *